(12) United States Patent
Somers et al.

(10) Patent No.: US 6,687,851 B1
(45) Date of Patent: Feb. 3, 2004

(54) METHOD AND SYSTEM FOR UPGRADING FAULT-TOLERANT SYSTEMS

(75) Inventors: Jeffrey S. Somers, Northborough, MA (US); Mark D. Tetreault, Webster, MA (US); Timothy M. Wegner, Westborough, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 0 days.

(21) Appl. No.: 09/548,527

(22) Filed: Apr. 13, 2000

(51) Int. Cl.$^7$ ................................................. G06F 11/00
(52) U.S. Cl. .............................. 714/12; 714/11; 714/13
(58) Field of Search .............................. 714/10, 11, 12, 714/13; 712/31

(56) References Cited

U.S. PATENT DOCUMENTS

| | | | |
|---|---|---|---|
| 3,192,362 A | 6/1965 | Cheney | 235/153 |
| 3,533,065 A | 10/1970 | Keel | 340/172.5 |
| 3,533,082 A | 10/1970 | Schnabel | 340/172.5 |
| 3,544,973 A | 12/1970 | Borck, Jr. et al. | |
| 3,548,176 A | 12/1970 | Shutler | |
| 3,593,307 A | 7/1971 | Gouge, Jr. | 340/172.5 |
| 3,641,505 A | 2/1972 | Artz et al. | |
| 3,665,173 A | 5/1972 | Bouricius et al. | 235/153 |
| 3,681,578 A | 8/1972 | Stevens | 235/153 |
| 3,688,274 A | 8/1972 | Cormier et al. | 340/172.5 |
| 3,710,324 A | 1/1973 | Cohen et al. | |
| 3,736,566 A | 5/1973 | Anderson et al. | |
| 3,783,250 A * | 1/1974 | Fletcher et al. | 714/11 |
| 3,795,901 A | 3/1974 | Boehm et al. | |

(List continued on next page.)

FOREIGN PATENT DOCUMENTS

| | | | |
|---|---|---|---|
| EP | 1 200 155 | 7/1970 | 3/22 |
| EP | 0 301 499 A2 | 1/1989 | |
| EP | 0 428 330 A2 | 5/1991 | |
| EP | 0 475 005 B1 | 11/1995 | |
| EP | 0 293 860 B1 | 2/1996 | |
| EP | 0 742 507 A1 | 11/1996 | |
| EP | 0 390 567 B1 | 6/1999 | |
| GB | 2 060 229 | 4/1981 | |
| WO | WO 99/66406 | 12/1999 | |

*Primary Examiner*—Scott Baderman
*Assistant Examiner*—Yolanda L. Wilson
(74) *Attorney, Agent, or Firm*—Testa, Hurwitz & Thibeault, LLP

(57) ABSTRACT

The inventive system includes an I/O subsystem that controls the synchronization of an off-line CPU to an on-line CPU, such that much of the synchronization operation takes place essentially as a background task for the on-line CPU. The I/O subsystem requests that the on-line CPU provide certain register and memory state information to general purpose registers on an I/O board. The I/O subsystem then provides the register contents to general purpose registers on the off-line CPU board, and the off-line CPU uses the information to set the states of certain of its registers and memory. The I/O system further includes a DMA engine that, at a time set by the I/O subsystem, copies pages of memory from the on-line CPU to the off-line CPU. At the end of the synchronization operation, the off-line CPU is directed to write to a predetermined register on the I/O board. When the off-line CPU performs the write operation, it indicates that the off-line CPU is in a known state and ready to go on-line. The I/O subsystem then holds the off-line CPU in the known state by stalling the return of an acknowledgement of the write operation. When the on-line CPU later performs the same write operation, the on-line and the off-line CPUs are then in essentially the same state. The I/O processor may then reset the CPUs to ensure that the off-line CPU goes on line and starts a next operating cycle in lock-step with the reset on-line CPU. The system also dynamically selects a CPU output stream comparison method based on the number of CPUs on line at a given time.

23 Claims, 3 Drawing Sheets

U.S. PATENT DOCUMENTS

| | | |
|---|---|---|
| 3,805,039 A | 4/1974 | Stiffler |
| 3,820,079 A | 6/1974 | Bergh et al. |
| 3,840,861 A | 10/1974 | Amdahl et al. |
| 3,879,712 A | 4/1975 | Edge et al. .............. 340/172.5 |
| 3,991,407 A | 11/1976 | Jordan, Jr. et al. |
| 3,997,896 A | 12/1976 | Cassarino, Jr. et al. |
| 4,015,246 A | 3/1977 | Hopkins, Jr. et al. |
| 4,030,074 A | 6/1977 | Giorcelli ..................... 364/200 |
| 4,032,893 A | 6/1977 | Moran |
| 4,059,736 A | 11/1977 | Perucca et al. |
| 4,099,234 A | 7/1978 | Woods et al. ............... 364/200 |
| 4,176,258 A | 11/1979 | Jackson ...................... 235/302 |
| 4,228,496 A | 10/1980 | Katzman et al. ............ 364/200 |
| 4,245,344 A | 1/1981 | Richter |
| 4,263,649 A | 4/1981 | Lapp, Jr. |
| 4,275,440 A | 6/1981 | Adams, Jr. et al. |
| 4,309,754 A | 1/1982 | Dinwiddie, Jr. |
| 4,323,966 A | 4/1982 | Whiteside et al. .......... 364/200 |
| 4,356,550 A | 10/1982 | Katzman et al. ............ 364/200 |
| 4,358,823 A | 11/1982 | McDonald et al. ......... 364/200 |
| 4,366,535 A | 12/1982 | Cedolin et al. ............. 364/200 |
| 4,369,494 A | 1/1983 | Bienvenu et al. |
| 4,375,683 A | 3/1983 | Wensley ...................... 371/36 |
| 4,434,463 A | 2/1984 | Quinquis et al. |
| 4,449,182 A | 5/1984 | Rubinson et al. |
| 4,453,215 A | 6/1984 | Reid ........................... 364/200 |
| 4,467,436 A | 8/1984 | Chance et al. |
| 4,484,273 A | 11/1984 | Stiffler et al. |
| 4,486,826 A | 12/1984 | Wolff et al. ................. 364/200 |
| 4,503,496 A | 3/1985 | Holzner et al. |
| 4,503,535 A | 3/1985 | Budde et al. .................. 371/61 |
| 4,507,784 A | 3/1985 | Procter ......................... 371/61 |
| 4,543,628 A | 9/1985 | Pomfret |
| 4,562,575 A | 12/1985 | Townsend |
| 4,583,224 A | 4/1986 | Ishii et al. ..................... 371/36 |
| 4,589,066 A * | 5/1986 | Lam et al. ................... 709/400 |
| 4,590,554 A | 5/1986 | Glazer et al. |
| 4,597,084 A | 6/1986 | Dynneson et al. ............ 371/51 |
| 4,608,631 A | 8/1986 | Stiffler et al. |
| 4,610,013 A | 9/1986 | Long et al. ..................... 371/9 |
| 4,622,667 A | 11/1986 | Yount ............................. 371/9 |
| 4,628,447 A | 12/1986 | Cartret et al. |
| 4,630,193 A | 12/1986 | Kris |
| 4,633,394 A | 12/1986 | Georgiou et al. |
| 4,633,467 A | 12/1986 | Abel et al. |
| 4,644,498 A | 2/1987 | Bedard et al. ............... 364/900 |
| 4,648,031 A | 3/1987 | Jenner ........................ 364/200 |
| 4,654,846 A | 3/1987 | Goodwin et al. ............... 371/8 |
| 4,654,857 A | 3/1987 | Samson et al. ................ 371/68 |
| 4,669,056 A | 5/1987 | Waldecker et al. |
| 4,669,079 A | 5/1987 | Blum |
| 4,686,677 A | 8/1987 | Flora ............................ 371/61 |
| 4,700,292 A | 10/1987 | Campanini |
| 4,703,420 A | 10/1987 | Irwin |
| 4,736,377 A | 4/1988 | Bradley et al. ................ 371/37 |
| 4,739,498 A | 4/1988 | Eichhorn .................... 365/200 |
| 4,750,177 A | 6/1988 | Hendrie et al. ............... 371/32 |
| 4,799,140 A | 1/1989 | Dietz et al. .................. 364/140 |
| 4,805,091 A | 2/1989 | Thiel et al. |
| 4,809,169 A | 2/1989 | Sfarti et al. |
| 4,816,990 A | 3/1989 | Williams .................... 364/200 |
| 4,827,409 A | 5/1989 | Dickson |
| 4,866,604 A | 9/1989 | Reid |
| 4,872,106 A * | 10/1989 | Slater ........................... 714/13 |
| 4,905,181 A | 2/1990 | Gregory ..................... 364/900 |
| 4,907,232 A | 3/1990 | Harper et al. ................. 371/36 |
| 4,914,580 A | 4/1990 | Jensen et al. |
| 4,916,695 A | 4/1990 | Ossfeldt ....................... 371/9.1 |
| 4,926,315 A | 5/1990 | Long et al. |
| 4,931,922 A | 6/1990 | Baty et al. |
| 4,939,643 A | 7/1990 | Long et al. |
| 4,974,144 A | 11/1990 | Long et al. |
| 4,974,150 A | 11/1990 | Long et al. |
| 4,985,830 A | 1/1991 | Atac et al. |
| 4,994,960 A | 2/1991 | Tuchler et al. |
| 5,005,174 A | 4/1991 | Bruckert et al. |
| 5,020,024 A | 5/1991 | Williams ..................... 364/900 |
| 5,083,258 A | 1/1992 | Yamasaki |
| 5,089,958 A | 2/1992 | Horton et al. ............... 395/575 |
| 5,117,486 A | 5/1992 | Clark et al. |
| 5,136,498 A * | 8/1992 | McLaughlin et al. .......... 700/79 |
| 5,136,704 A | 8/1992 | Danielsen et al. ........... 395/575 |
| 5,138,257 A | 8/1992 | Katsura |
| 5,155,809 A | 10/1992 | Baker et al. |
| 5,157,663 A | 10/1992 | Major et al. |
| 5,179,663 A | 1/1993 | Iimura |
| 5,193,162 A | 3/1993 | Bordsen et al. |
| 5,193,180 A | 3/1993 | Hastings ..................... 395/575 |
| 5,220,668 A | 6/1993 | Bullis ......................... 395/650 |
| 5,226,152 A | 7/1993 | Klug et al. |
| 5,231,640 A | 7/1993 | Hanson et al. .............. 371/68.3 |
| 5,243,704 A | 9/1993 | Baty et al. |
| 5,247,522 A | 9/1993 | Reiff .......................... 371/29.5 |
| 5,249,187 A | 9/1993 | Bruckert et al. ............. 371/68.1 |
| 5,251,303 A | 10/1993 | Fogg, Jr. et al. ............. 395/275 |
| 5,263,034 A | 11/1993 | Guenthner et al. ......... 371/68.3 |
| 5,270,699 A | 12/1993 | Signaigo et al. ........ 340/825.01 |
| 5,271,023 A * | 12/1993 | Norman ........................ 714/10 |
| 5,283,870 A | 2/1994 | Joyce et al. |
| 5,295,258 A | 3/1994 | Jewett et al. ................ 395/575 |
| 5,313,627 A | 5/1994 | Amini et al. ................ 395/575 |
| 5,317,726 A | 5/1994 | Horst ......................... 395/575 |
| 5,321,706 A | 6/1994 | Holm et al. ................ 371/51.1 |
| 5,333,265 A | 7/1994 | Orimo et al. |
| 5,357,612 A | 10/1994 | Alaiwan |
| 5,361,267 A | 11/1994 | Godiwala et al. ........... 371/40.1 |
| 5,379,381 A * | 1/1995 | Lamb ............................ 710/6 |
| 5,384,906 A * | 1/1995 | Horst ......................... 709/400 |
| 5,388,242 A | 2/1995 | Jewett |
| 5,392,302 A | 2/1995 | Kemp et al. ................ 371/51.1 |
| 5,404,361 A | 4/1995 | Casorso et al. ............. 371/40.1 |
| 5,423,024 A | 6/1995 | Cheung ...................... 395/575 |
| 5,428,766 A | 6/1995 | Seaman ...................... 395/575 |
| 5,430,866 A | 7/1995 | Lawrence et al. ........... 395/575 |
| 5,463,755 A | 10/1995 | Dumarot et al. |
| 5,465,328 A | 11/1995 | Dievendorff et al. |
| 5,465,340 A | 11/1995 | Creedon et al. |
| 5,537,535 A | 7/1996 | Maruyama et al. ..... 395/183.01 |
| 5,550,986 A | 8/1996 | DuLac |
| 5,555,372 A | 9/1996 | Tetreault et al. |
| 5,574,865 A | 11/1996 | Hashemi |
| 5,581,750 A | 12/1996 | Haderle et al. |
| 5,583,987 A * | 12/1996 | Kobayashi et al. ............ 714/12 |
| 5,584,030 A | 12/1996 | Husak et al. |
| 5,586,253 A | 12/1996 | Green et al. ............. 395/185.06 |
| 5,600,784 A | 2/1997 | Bissett et al. ............. 395/182.1 |
| 5,613,162 A | 3/1997 | Kabenjian |
| 5,615,403 A * | 3/1997 | Bissett et al. .................. 710/61 |
| 5,621,885 A | 4/1997 | Del Vigna, Jr. |
| 5,627,965 A | 5/1997 | Liddell et al. |
| 5,630,046 A | 5/1997 | Loise |
| 5,630,056 A | 5/1997 | Horvath et al. |
| 5,659,681 A | 8/1997 | Ojima |
| 5,671,443 A | 9/1997 | Stauffer et al. |
| 5,682,513 A | 10/1997 | Candelaria et al. |
| 5,694,541 A | 12/1997 | Service et al. |
| 5,696,905 A | 12/1997 | Reimer et al. |
| 5,701,410 A | 12/1997 | BeMent et al. |
| 5,701,457 A | 12/1997 | Fujiwara ..................... 395/608 |
| 5,721,918 A | 2/1998 | Nilsson et al. |
| 5,724,581 A | 3/1998 | Kozakura |

| | | |
|---|---|---|
| 5,737,601 A | 4/1998 | Jain et al. |
| 5,748,873 A | 5/1998 | Ohguro et al. |
| 5,751,955 A | 5/1998 | Sonnier et al. |
| 5,758,065 A | 5/1998 | Reams et al. .......... 395/185.01 |
| 5,781,910 A | 7/1998 | Gostanian et al. .......... 707/201 |
| 5,787,485 A | 7/1998 | Fitzgerald, V et al. |
| 5,790,397 A | 8/1998 | Bissett et al. ................ 364/131 |
| 5,790,775 A | 8/1998 | Marks et al. |
| 5,802,265 A | 9/1998 | Bressoud et al. |
| 5,809,256 A | 9/1998 | Najemy |
| 5,812,748 A | 9/1998 | Ohran et al. |
| 5,815,647 A | 9/1998 | Buckland et al. |
| 5,828,903 A | 10/1998 | Sethuram et al. |
| 5,838,899 A | 11/1998 | Leavitt et al. ......... 395/185.09 |
| 5,838,900 A | 11/1998 | Horvath et al. |
| 5,838,993 A | 11/1998 | Riley et al. |
| 5,845,060 A * | 12/1998 | Vrba et al. .................... 714/12 |
| 5,862,145 A | 1/1999 | Grossman et al. ........... 371/5.1 |
| 5,870,301 A | 2/1999 | Yakushiji et al. |
| 5,875,308 A | 2/1999 | Egan et al. |
| 5,875,351 A | 2/1999 | Riley |
| 5,881,251 A | 3/1999 | Fung et al. |
| 5,890,003 A | 3/1999 | Cutts, Jr. et al. |
| 5,892,928 A | 4/1999 | Wallach et al. |
| 5,894,560 A | 4/1999 | Carmichael et al. |
| 5,896,523 A | 4/1999 | Bissett et al. ................ 395/551 |
| 5,903,717 A * | 5/1999 | Wardrop ...................... 714/12 |
| 5,918,229 A | 6/1999 | Davis et al. |
| 5,928,339 A | 7/1999 | Nishikawa ................... 710/26 |
| 5,933,838 A | 8/1999 | Lomet |
| 5,944,800 A | 8/1999 | Mattheis et al. |
| 5,953,538 A | 9/1999 | Duncan et al. |
| 5,956,474 A | 9/1999 | Bissett et al. ......... 395/182.09 |
| 5,956,476 A | 9/1999 | Ranson et al. |
| 5,968,185 A | 10/1999 | Bressoud et al. |
| 5,978,866 A | 11/1999 | Nain |
| 5,982,672 A | 11/1999 | Moon et al. |
| 5,983,289 A | 11/1999 | Ishikawa et al. |
| 5,983,371 A | 11/1999 | Lord et al. |
| 5,991,900 A | 11/1999 | Garnett |
| 5,996,035 A | 11/1999 | Allen et al. |
| 6,000,043 A | 12/1999 | Abramson |
| 6,009,535 A | 12/1999 | Halligan et al. |
| 6,012,120 A | 1/2000 | Duncan et al. |
| 6,021,456 A | 2/2000 | Herdeg et al. |
| 6,026,458 A | 2/2000 | Rasums |
| 6,032,271 A | 2/2000 | Goodrum et al. ............. 714/56 |
| 6,038,685 A | 3/2000 | Bissett et al. ................. 714/12 |
| 6,041,375 A | 3/2000 | Bass et al. |
| 6,047,343 A | 4/2000 | Olarig |
| 6,049,894 A | 4/2000 | Gates ......................... 714/41 |
| 6,055,584 A | 4/2000 | Bridges et al. |
| 6,062,480 A | 5/2000 | Evoy |
| 6,065,017 A | 5/2000 | Barker |
| 6,065,135 A | 5/2000 | Marshall et al. |
| 6,067,550 A | 5/2000 | Lomet |
| 6,073,196 A | 6/2000 | Goodrum et al. |
| 6,085,200 A | 7/2000 | Hill et al. |
| 6,098,137 A | 8/2000 | Goodrum et al. |
| 6,115,829 A * | 9/2000 | Slegel et al. .................. 714/10 |
| 6,119,128 A | 9/2000 | Courter et al. |
| 6,125,417 A | 9/2000 | Bailis et al. |
| 6,141,718 A | 10/2000 | Garnett et al. |
| 6,141,769 A | 10/2000 | Petivan et al. ................. 714/10 |
| 6,148,348 A | 11/2000 | Garnett et al. |
| 6,199,171 B1 | 3/2001 | Bossen et al. |
| 6,233,702 B1 | 5/2001 | Horst et al. |
| 6,357,024 B1 | 3/2002 | Dutton et al. |
| 6,374,365 B1 | 4/2002 | Lahmann |
| 6,393,582 B1 | 5/2002 | Klecka et al. |

* cited by examiner

METHOD AND SYSTEM FOR UPGRADING FAULT-TOLERANT SYSTEMS

BACKGROUND OF THE INVENTION

1. Field of the Invention

The invention relates in general to fault-tolerant computer systems and, more particularly, to mechanisms for upgrading the systems to include additional central processing units ("CPUs") while the system is operative.

2. Background Information

The fault-tolerant systems of interest operate redundant CPUs in lock-step, that is, in cycle-to-cycle synchronism. Accordingly, before an off-line CPU is brought on-line, to upgrade the system from single-mode redundancy to double-mode redundancy or double to triple-mode redundancy and so forth, the off-line CPU must first be synchronized to the state of an on-line CPU. Similarly, an off-line CPU must be synchronized to the on-line CPU when, for example, a faulty CPU is replaced.

In prior known lock-step systems, the on-line CPU communicates directly with the off-line CPU in accordance with a special synchronization protocol. The CPU boards in the prior system include dedicated synchronization hardware that allows the CPUs to communicate using the synchronization protocol. Accordingly, the CPU boards are both time consuming and expensive to design and manufacture.

Using the synchronization protocol, the on-line CPU directs the off-line CPU to set various components, such as certain registers and memory locations, to states that correspond to the states of the associated registers and memory locations of the on-line CPU. The on-line CPU thus controls a series of back and forth communications between the two CPUs, to provide the state information to the off-line CPU and to instruct the off-line CPU to use the information to set the registers and memory locations to the appropriate states. Accordingly, the other processing operations performed by the on-line CPU may be disrupted during the synchronization process.

SUMMARY OF THE INVENTION

The inventive system includes an I/O subsystem that controls the synchronization of an off-line CPU to an on-line CPU, such that much of the synchronization operation takes place essentially as a background task for the on-line CPU. The I/O subsystem requests that the on-line CPU to provide certain register and memory state information to general purpose registers on an I/O board. The I/O subsystem then copies the register contents to general purpose registers on the off-line CPU board, and the off-line CPU uses the information to set the states of certain of its registers and memory. The I/O system further includes a DMA engine that, at a time set by the I/O subsystem, copies is pages of memory from the on-line CPU to the off-line CPU.

At the end of the synchronization operation, the off-line CPU is directed to write to a predetermined register on the I/O board. When the off-line CPU performs the write operation, it indicates that the off-line CPU is in a known state and ready to go on-line. The I/O subsystem then holds the off-line CPU in the known state by stalling the return of an acknowledgement of the write operation. When the on-line CPU later performs the same write operation, the on-line and the off-line CPUs are then in essentially the same state, and the I/O processor resets the CPUs to ensure that the off-line CPU goes on line and starts a next operating cycle in lock-step with the on-line CPU.

The I/O subsystem includes comparison logic that is updated when the off-line CPU changes its status to on-line as part of the reset operation. The comparison logic then compares the output streams from the previously on-line CPUs and the newly added on-line CPU. Accordingly, after the CPUs reset, the comparison logic compares two output streams if the system went from single to double modular redundancy, or three output streams if the system went from double to triple modular redundancy, and so forth. As discussed in more detail below, when the output streams do not agree the comparison logic also properly handles voting based on the number of on-line CPUs. The system thus dynamically changes its comparison method, as CPUs are added to or removed from the system.

The communications between the on-line CPU and the I/O subsystem, and the I/O subsystem and the off-line CPU do not require a special synchronization communication protocol. Accordingly, the synchronization operation is less complex than the synchronization operations of the prior lock-step systems. Further, the components involved in the synchronization operation, namely, the general purpose registers and the DMA engine, are used for more than just the synchronization operation, and are thus not dedicated synchronization hardware. Also, the synchronization operation is controlled by the I/O subsystem, and thus, the processing operations of the on-line CPU are only minimally interrupted or disrupted. Finally, the comparison logic used to ensure valid output streams dynamically changes based on the number of on-line CPUs, and the system can thus be upgraded in the field.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
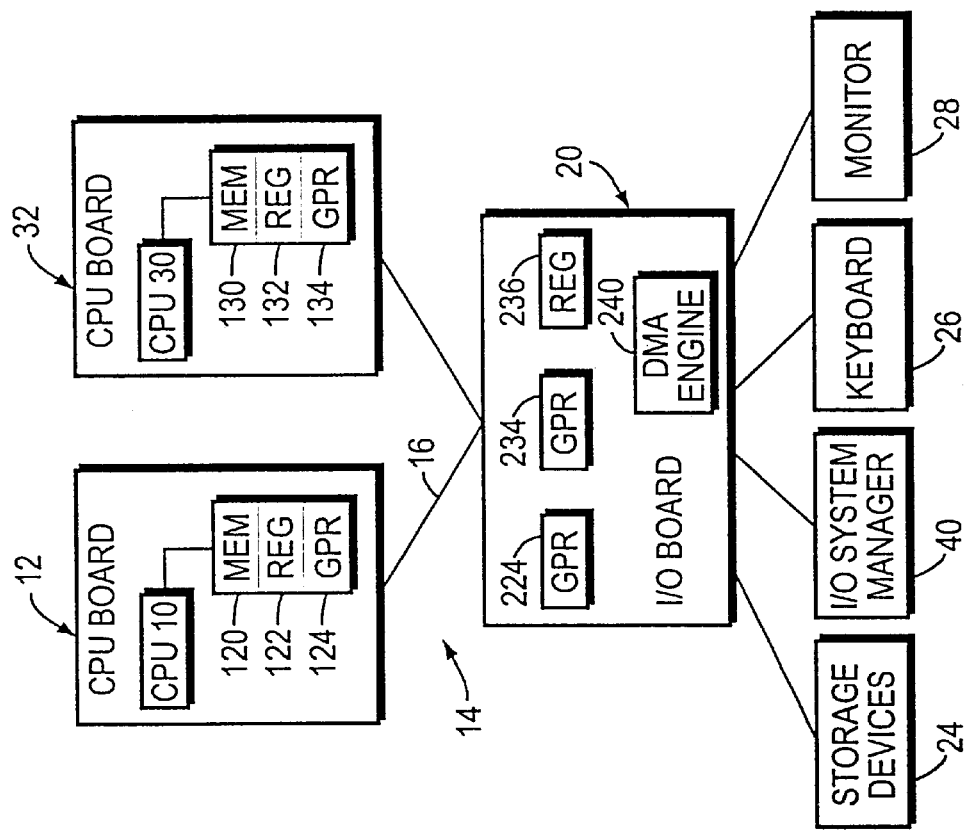
FIG. 1 is a functional block diagram of a system constructed in accordance with the invention.

Referring to FIG. 1, a CPU 10, which is included on a CPU board 12 along with associated memory 120 and registers 122, communicates with various I/O devices, such as storage devices 24, a keyboard 26, and a monitor 28 through an I/O subsystem 14, which includes an I/O bus 16 and an I/O board 20 and associated component. To add fault tolerance, a second CPU 30 is included in the system. The two CPUs 10 and 30 must operate in lock-step, that is, in cycle-to-cycle synchronism. Accordingly, when the CPU 30 is brought on-line, the associated memory 130 and registers 132 on the CPU board 32 must be in essentially the same state as the corresponding memory 120 and registers 122 on the CPU board 12.

For convenience, the CPU 10, CPU board 12 and associated components are referred to hereinafter as the "on-line CPU," and the CPU 30, CPU board 32 and associated components are referred to hereinafter as the "off-line CPU." Also for convenience, we have depicted only those on-board components that are involved in the synchronization operation. We discuss below how the off-line CPU is brought on-line in synchronism with the on-line CPU.

Figure 2:
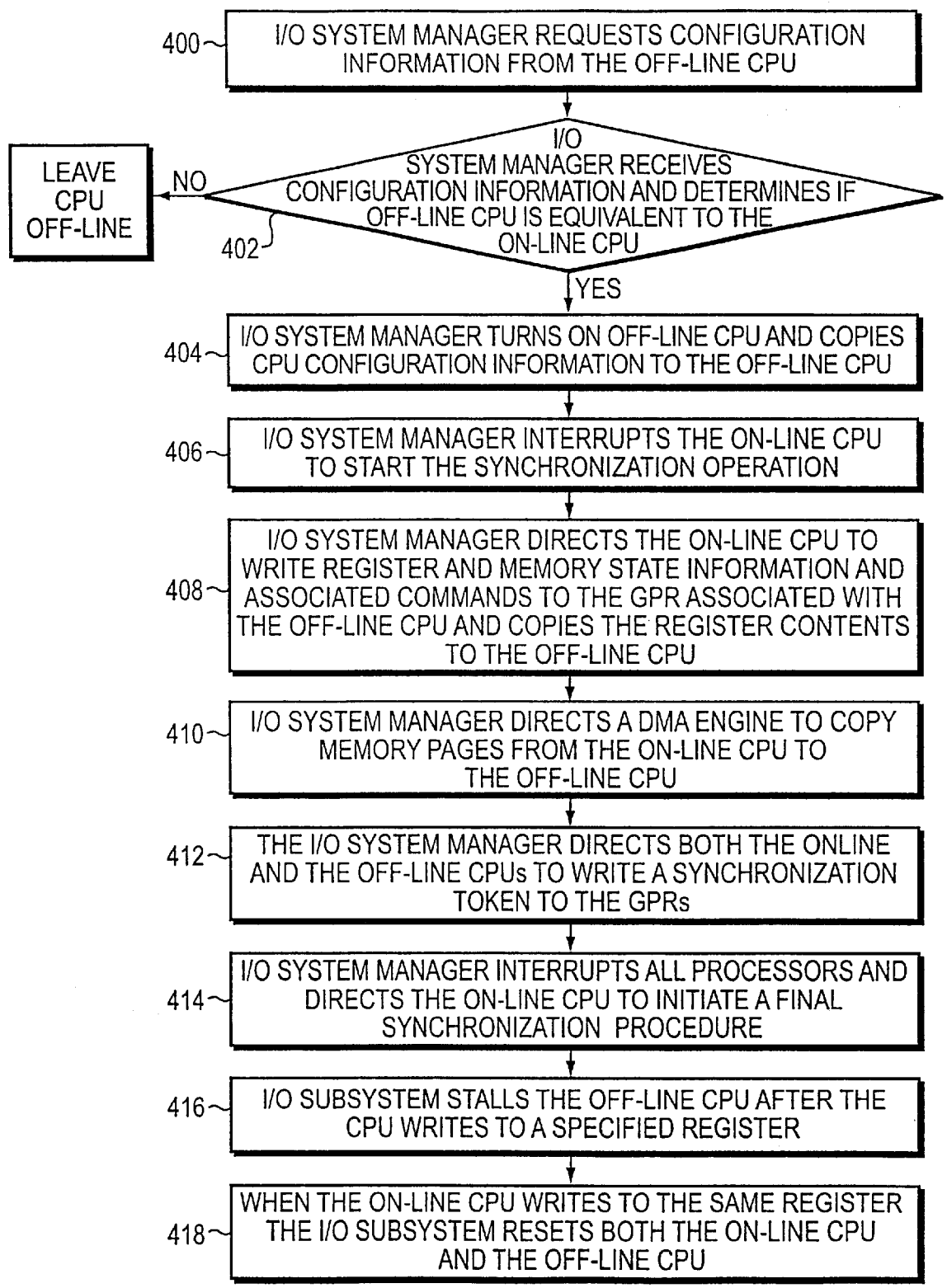
FIG. 2 is a flow chart of the CPU synchronization operations of the system of FIG. 1.

Referring now also to FIG. 2, when the off-line CPU is plugged in, the off-line CPU performs conventional tests to ensure that it is operational. If the off-line CPU is operational, an I/O system manager 40 requests configuration information from the CPU, to determine if the CPU is equivalent to the on-line CPU (step 400). The off-line CPU provides to the I/O system manager information such as the size and type of memory, the number and types of processors, and so forth (step 402). If the I/O system manager determines that the off-line CPU is the equivalent of the on-line CPU, the manager turns on the off-line CPU (step 404). The I/O system manager may be, for example, a kernel in the operating system, such that the operating system ultimately controls the synchronization operation, or the manager may be part of the system's BIOS. Accordingly, the I/O system manager may be distributed throughout the system or resident on a given board.

Each CPU includes a set of general purpose registers ("GPR") 124, 134 that are used to hold status, error and other information. The I/O subsystem includes on the I/O board 20 associated, or "shadow," sets of GPRs 224, 234 . . . , one for each CPU that can be supported by the system. When a given CPU changes the information in its GPR, the change is also written into the corresponding GPR on the I/O board. Other system components can then look at the contents of the I/O subsystem GPRs, as needed, for updated status information, and so forth. The on-line CPU can write to the GPR 234 associated with the off-line CPU, and in this way can communicate with the off-line CPU without requiring a specialized communication protocol or specialized hardware.

One register in the GPR is a configuration register that includes information about the on-line or off-line status of each of the CPUs. The on-line CPUs write their on-line status into the configuration register in each set of GPRs. When the off-line CPU is plugged in and turned on, the CPU automatically records its change of status from turned off to turned on in the configuration registers of the associated GPRs 134 and 234. The off-line CPU can not write to the GPRs associated with the on-line CPUs, and thus, the configuration registers in the remaining GPRs on the I/O board do not change.

The I/O subsystem copies the contents of at least the configuration register to the GPR 134 of the off-line CPU. The off-line CPU reads the configuration information to determine if there are any CPUs then on-line. If so, the off-line CPU participates in a synchronization operation that is under the control of the I/O subsystem, by looking to the GPR 134 for associated commands.

To start the synchronization operation, the I/O system manager 40 issues an interrupt to the on-line CPU (step 406). The on-line CPU checks the GPRs 224 and 234 on the I/O board, to determine the cause of the interrupt. The on-line CPU thus determines that an off-line CPU is being brought on-line, after checking the configuration register 234 that is associated with the off-line CPU. The on-line CPU then participates in the synchronization operation.

As part of the synchronization operation, the I/O system manager 40 requests that the on-line CPU write the states of various components, such as certain registers 122 and/or the contents of certain memory locations in memory 120, to specified locations in the GPR 234 that is associated with the off-line CPU (step 408). The on-line CPU then proceeds with its other processing operations in a usual manner.

Before copying the contents of the GPR 234 to the GPR 134, the I/O system manager or the on-line CPU, as appropriate, includes in the GPR 234 a command that tells the off-line CPU to set certain of its registers 132 and/or certain of its memory locations to the specified states. Once I/O system manager copies the contents of the GPR 234 to the GPR 134 on the off-line board 32, the off-line CPU consults the GPR 134 and, in accordance with the command contained therein, sets the appropriate registers 132 and/or memory locations in the memory 130 to the states specified in the GPR. The off-line CPU acknowledges that it has executed the command by writing an acknowledgement to the GPR 234. As necessary, the I/O system manager 40 directs the on-line CPU to continue writing state information to the specified locations in the GPR 234, and so forth.

A DMA engine 240, which operates under the control of the I/O system manager 40, also supplies memory state information to the off-line CPU (step 410). The DMA engine essentially copies the contents of memory pages from the memory 120 of the on-line CPU to predetermined locations in a memory 130 of the off-line CPU. The system manager 40 controls the timing of the data move operation, so that the operation only minimally delays the processing operations of the on-line CPU.

The I/O subsystem manager may stall or mask incoming interrupts and allow the on-line CPU to respond to any queued interrupts before the start of the memory copy operation. This ensures that the copied memory information does not change while the memory copy operation is taking place. The I/O subsystem manager may, as necessary, monitor the operations of the on-line CPU after the memory copy, to keep track of changes to the contents of the memory. The I/O system manager then provides the changes to the off-line CPU during a later step in the synchronization operation.

Both the off-line CPU and the on-line CPU are each directed to write a synchronization token into the appropriate GPRs 224 and 234 (step 412). As discussed in more detail below, the synchronization tokens serve to remind the CPUs, after reset, that they have completed the synchronization operation.

The I/O system manager 40 next triggers a system management interrupt to all of the I/O system processors. In response, all of the processors save their register states to memory. As necessary, the I/O system manager also directs that the memory change information be provided to the off-line CPU and stored in memory. Further, the I/O system manager directs the on-line CPU to initiate, as a final step, a CPU synchronization procedure (step 414). The on-line CPU instructs the off-line CPU to perform a "sync write" operation by writing into the GPR 234 a command that instructs the off-line CPU to write to a predetermined register 236 on the I/O board 20. The register 236 may, but need not, be part of the GPR 234. The on-line CPU then starts a timer (not shown) to establish when the on-line CPU will write to the same register 236.

The I/O system manager 40 copies the contents of the GPR 234 to the GPR 134 on the off-line CPU. The off-line CPU reads the GPR 134, updates memory, as appropriate, and writes to the register 236. When the off-line CPU writes to the register 236, the off-line CPU has completed setting its register and memory to the specified states and is ready to go on-line. In response to the write to the register 236, the I/O sub-system stalls the off-line CPU in its current, known state by delaying the sending of a write acknowledge (step 416). At an appropriate time after the start of the sync write operation, that is, when the timer times out, the on-line CPU also writes to the register 236. The two CPUs are then in essentially the same, known state. The I/O subsystem then resets both the on-line CPU and the stalled off-line CPU, to ensure that they both start the next operating cycle in lock-step (step 418).

When the two CPUs 10 and 30 come out of reset, they consult the GPRs on the I/O board 20, to determine the cause of the reset. The synchronization token, which was written into the register 234 before the reset, informs the CPUs that they have just completed a synchronization operation. The off-line CPU then sets its status to on-line, and writes the change of status to the configuration registers in the GPRs 224 and 234. Further, the memories are turned on and the saved register states are restored. At the start of a next clock cycle, the two CPUs 10 and 30 begin their processing operations in lock-step.

The interrupts that had been delayed earlier are provided to each of the CPUs, and normal CPU operations continue. After reset, the system may also check that the contents of the memory 130 of the previously off-line CPU match the contents of the memory 120 of the on-line CPU, to ensure that the CPUs will continue operating in lock-step. If the memories 130 and 120 do not agree, the system takes the previously off-line CPU off-line again.

Figure 3:
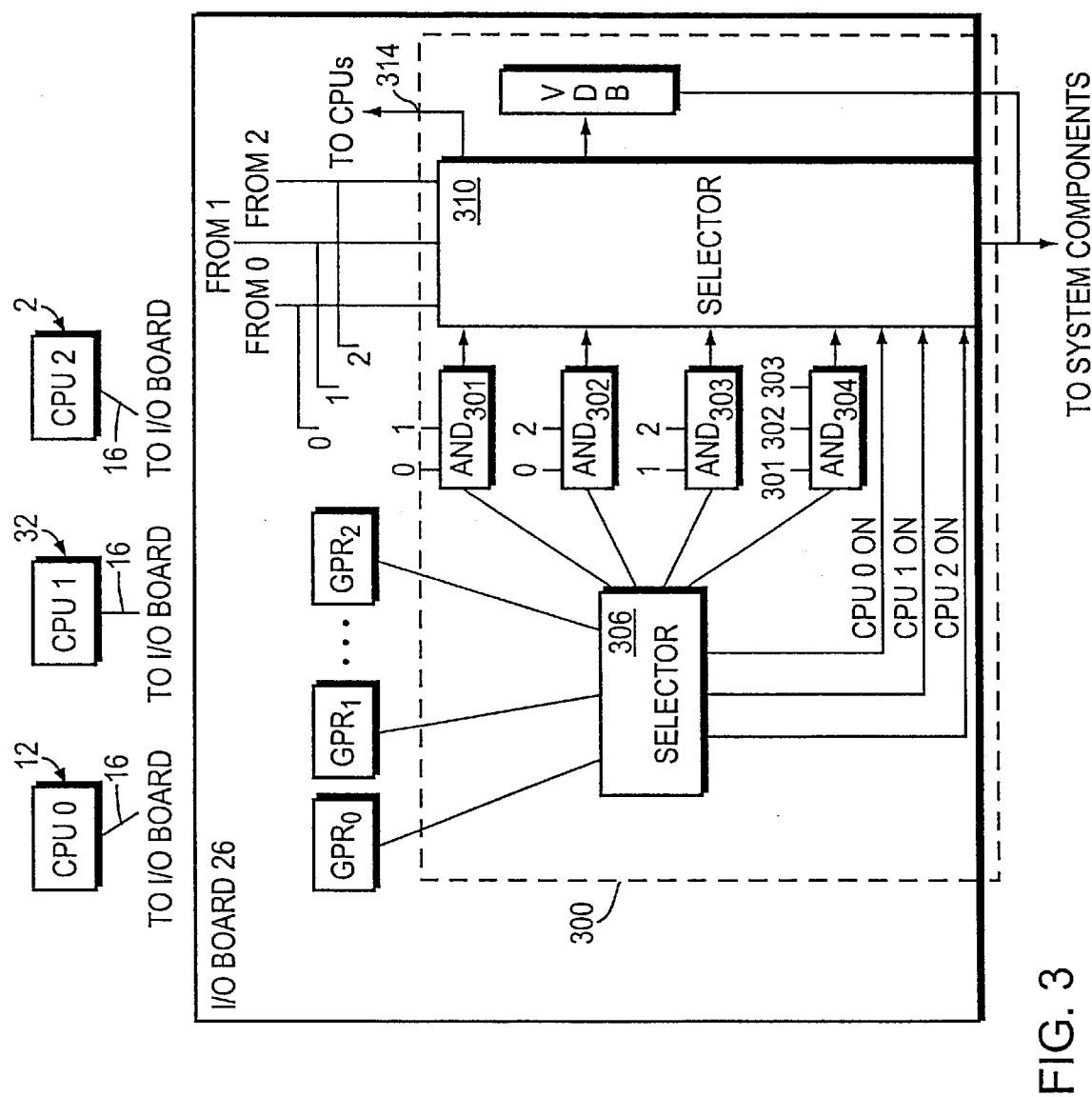
FIG. 3 is a more detailed functional block diagram of a portion of the system of FIG. 1.

Referring also to FIG. 3, the I/O subsystem includes on the I/O boards 26 comparison logic 300 that determines if the output streams of address/data/control signals from all of the on-line CPUs agree. The comparison logic thus compares two output streams when there are two on-line CPUs, three output streams when there are three on-line CPUs, and so forth. The comparison logic dynamically selects the comparison method, based on the number of CPUs currently on-line.

When the off-line CPU changes its status to on-line and updates the GPR configuration information as discussed above, the change in status also updates the comparison logic. Based on the status information in the GPRs, the comparison logic in the exemplary system configures itself to perform a two-stream compare or a three-stream compare. The comparison logic may include, in the example, three AND gates 301, 302, 303 for the two stream compare and a fourth AND gate 304 that is used for the three stream compare. A selector 306 then selects one of the three AND gates 301–303 for the two-stream compare, all four AND gates for the three stream compare or no AND is gates for a single stream pass-through, based on the states of the status bits in the configuration register of one or more GPRs.

If three CPUs, referred to as CPUs 0, 1 and 2 in the drawing, are currently on-line, the comparison logic compares the three output streams bit-by-bit for each operating a cycle in AND gates 301–303, where the output streams are referred to in the drawing as the numbered lines entering these AND gates. If the AND gate 304 indicates that all three output streams do not agree, the comparison logic identifies the improperly functioning CPU by majority vote. The comparison logic thus identifies the CPU that sent the one stream that does not agree with the other two streams. The comparison logic then sends a signal on line 314 to the malfunctioning CPU, instructing the CPU to go off-line. The selector 310 also sends one of the valid output streams to the system components, based on the signals provided by the AND gates 301–304.

When the malfunctioning CPU goes off-line, the CPU updates its configuration information appropriately. In the example, the comparison logic dynamically configures itself to compare the output streams from the remaining two on-line CPUs.

If only two CPUs are on-line, the system compares the two output streams in the appropriate AND gate 301, 302 or 303. If the two output streams agree, a selector 310 sends one of the streams to the system components. If the two streams do not agree, the selector 310 sends the two output streams internally to a voter delay buffer 312. The voter delay buffer holds the two streams until the system can determine which of the two on-line CPUs is properly functioning, and thus, which of the two output streams is valid. The comparison logic then passes the valid output stream to the appropriate system components.

The voter delay buffer is discussed in more detail in a co-pending application entitled Fault Tolerant Computer System with Voter Delay Buffer and identified by Cesari and McKenna file number 104160-0007, which is assigned to a common assignee and incorporated herein by reference.

If only one CPU is on-line, the comparison logic 300 no longer needs to act on the remaining output stream. Accordingly, the selector 306 informs the selector 310 which CPU is then on-line, and the selector 310 passes the corresponding output stream through to the appropriate system components.

As discussed above, the off-line CPU is synchronized to the on-line CPU without need of a special synchronization communication protocol or dedicated synchronization hardware on the CPU board. Further, the synchronization operation, which is controlled by the I/O system manager, causes minimal disruption of the other activities of the on-line CPU, and is thus not noticed by a system user. Also, the system dynamically configures its comparison logic based on the number of CPUs on-line at any given time. Accordingly, the system can be upgraded from single to double to triple modular redundancy and so forth and/or faulty CPUs can be removed and/or replaced, while the system is operative and without adversely affecting the operations of the system. The same operation may also be used to bring additional CPUs on-line and into lock-step operation with the on-line CPUs.

The foregoing description has been limited to a specific embodiment of this invention. It will be apparent, however, that variations and modifications may be made to the invention, such as allowing off-line CPUs to read from and write to the associated GPR on the I/O board, operating the two CPUs in lock-step from the same known state without resetting the CPUs, providing various other arrangements of AND gates or other logic gates in the comparison logic to produce the appropriate control signals for the selectors, using a cross-bar or other type of multiple-input line switch in place of the selectors to provide signals to the system components, performing the comparison operations in software, or firmware, and so forth, with the attainment of some or all of its advantages. Therefore, it is the object of the appended claims to cover all such variations and modifications as come within the true spirit and scope of the invention.

What is claimed is:

1. A fault-tolerant computer system including:
   A. an on-line CPU;
   B. an off-line CPU;
   C. an I/O subsystem that communicates with the on-line and off-line CPUs; and
   D. an I/O subsystem manager that controls a synchronization operation in which the off-line CPU is synchronized to on-line CPU, the I/O system manager directing
      i. the on-line CPU to provide component state information to the I/O subsystem,
      ii. the I/O subsystem to provide the component state information to the off-line CPU, and
      iii. the off-line CPU to set corresponding components to the specified states, the I/O system manager controlling the time at which the off-line CPU is brought on-line to operate in lock-step with the on-line CPU by directing each of the CPUs to a known operating state before bringing the off-line CPU on-line.

2. The computer system of claim 1 wherein the I/O subsystem includes registers in which the on-line CPU writes the component state information that is to be provided to the off-line CPU.

3. The computer system of claim 2 further includes a DMA engine that under the control of the I/O system manager copies memory states associated with the on-line CPU to the off-line CPU before the off-line CPU is brought on-line.

4. The computer system of claim 3 wherein the I/O system manager further
   iv. directs the on-line CPU to perform a sync write operation in which the on-line CPU includes in the registers a write command that directs the off-line CPU to write to a predetermined register when the off-line CPU is ready to go on-line, and
   v. stalls the off-line CPU in a known state associated with the sync write operation until the on-line CPU is in the same known state.

5. The computer system of claim 4 wherein the I/O system manager stalls the off-line CPU by delaying acknowledgment of the write until the on-line CPU also writes to the predetermined register.

6. The computer system of claim 3 wherein the I/O system manager resets the on-line and the off-line CPUs after completion of the sync write operation, to bring the off-line CPU on-line and in lock-step with the on-line CPU.

7. The computer system of claim 6 wherein
   a. the I/O system manager directs the off-line CPU to write a synchronization token to the registers, and
   b. the on-line and off-line CPUs determine that they are reset as part of a synchronization operation when they read the synchronization token in the registers.

8. The computer system of claim 1 wherein the system further includes one or more additional on-line CPUs that operate in lock-step with the on-line CPU.

9. The computer system of claim 1 further including comparison logic for comparing output streams from two or more on-line CPUs, the comparison logic selecting at a given time the number of streams to compare based on the number of CPUs on line at the given time.

10. The computer system of claim 9, wherein the comparison logic further includes a voter delay buffer for holding output streams from two on-line CPUs, the voter delay buffer holding the streams until the system determines which of the two streams to send on.

11. A method for synchronizing an off-line CPU to an on-line CPU, the method including the steps of:
   A. providing component state information from an on-line CPU to an I/O subsystem;
   B. providing the component state information from the I/O subsystem to an off-line CPU and directing the off-line CPU to set corresponding components to the same states;
   C. directing the off-line CPU to a known state;
   D. holding the off-line CPU in the known state until the on-line CPU is in the same known state;
   E. allowing the off-line CPU to go on-line and operate in lock-step with the on-line CPU in a next operating cycle.

12. The method of claim 11 wherein the step of providing component state information from the on-line CPU to the I/O subsystem includes writing the information to registers in the I/O subsystem.

13. The method of claim 11 further including in the step of providing component state information from the on-line CPU to the I/O subsystem the step of copying memory states associated with the on-line CPU to the off-line CPU.

14. The method of claim 11 wherein the step of directing the off-line CPU to a known state includes the step of directing the off-line CPU to write to a predetermined register when the off-line CPU is ready to go on-line.

15. The method of claim 14 wherein the step of holding the off-line CPU in the known state includes the step of stalling the off-line CPU by delaying an acknowledgement of the write to the predetermined register until the on-line CPU also writes to the predetermined register.

16. The method of claim 15 wherein the step of allowing the off-line CPU to go on-line includes the step of resetting the off-line CPU and the on-line CPU, to bring the off-line CPU on-line and in lock-step with the on-line CPU.

17. The method of claim 16 wherein the step of resetting the CPUs further includes
   c. directing the off-line CPU to write a synchronization token to the registers, and
   d. after reset, checking the registers to determine the reason for reset, the CPUs determining that the reset is part of a synchronization operation when they find the synchronization token in the registers.

18. A fault tolerant computer system including:
A. one or more CPUs;
B. an I/O subsystem that communicates with the CPUs, the I/O subsystem including
   i. registers for holding CPU status information,
   ii. comparison logic for comparing output streams from a plurality of on-line CPUs,
   iii. one or more selectors for selecting a comparison method based on the number of CPUs on-line at a given time, and
   iv. a voter delay buffer for holding the output streams from two on-line CPUs until the system can determine which of the two CPUs is malfunctioning,
      the one or more selectors selecting the voter delay buffer to hold the output streams when two CPUs are on-line and the output streams from the two on-line CPUs do not agree.

19. The system of claim 18 wherein
c. the selectors select a majority vote comparison method if three or more CPUs are on-line, and
d. the selectors select as malfunctioning the on-line CPU that provides the output stream that does not agree with the output streams from a majority of the on-line CPUs.

20. The system of claim 19 wherein
e. the comparison logic includes a plurality of comparison gates; and
f. the selectors select the gates to be used for a given comparison operation.

21. A method for selecting a valid output stream from one or more CPUs, the method including the steps of
   A. determining how many CPUs are on-line at a given time;
   B. selecting a comparison method based on the number of CPUs on-line;
   C. if three or more CPUs are on-line selecting one of the data streams that agrees with a majority of the other data steams;
   D. if two CPUs are on-line and the corresponding data streams do not agree,
      i. sending the data streams to a voter delay buffer,
      ii. holding the data streams in the buffer until one of the CPUs goes off-line, and
      iii. selecting the output stream that corresponds to the remaining on-line CPU.

22. The method of claim 21 wherein the step of comparing the output streams from three or more on-line CPUs includes selecting an appropriate number of comparison gates to identify which of the output streams does not agree with the majority of output streams.

23. The method of claim 22 wherein the step of selecting an output stream when three or more CPUs are on-line further includes notifying the CPU, which corresponds to the output stream that does not agree with the majority, that the CPU should go off line.

* * * * *